May 26, 1959 H. NETZER 2,888,541
ENCAPSULATED INDUCTION HEATING COIL STRUCTURE
Filed Oct. 1, 1957

United States Patent Office
2,888,541
Patented May 26, 1959

2,888,541

ENCAPSULATED INDUCTION HEATING COIL STRUCTURE

Henry Netzer, Glen Burnie, Md., assignor to Westinghouse Electric Corporation, East Pittsburgh, Pa., a corporation of Pennsylvania Application October 1, 1957, Serial No. 687,513

7 Claims. (Cl. 219—10.41)

This invention relates to induction heating coils and particularly to resin encapsulated induction heating coil structures suitable for use in induction heating of members.

The object of this invention is to provide a resin encapsulated induction heating coil structure suitable for use in induction heating of members comprising a magnetic shoe member, a tubular coil wound around the magnetic shoe member, and a specific encapsulating resinous composition.

Another object of this invention is to provide a method of encasing an induction heating coil structure in a specific resinous composition so as to provide an encapsulated induction heating coil structure suitable for use in induction heating of members.

Other objects of this invention will, in part, be obvious and will, in part, appear hereinafter.

For a better understanding of the nature and objects of the invention reference should be had to the following detailed description and drawing, in which.

Figure 1:
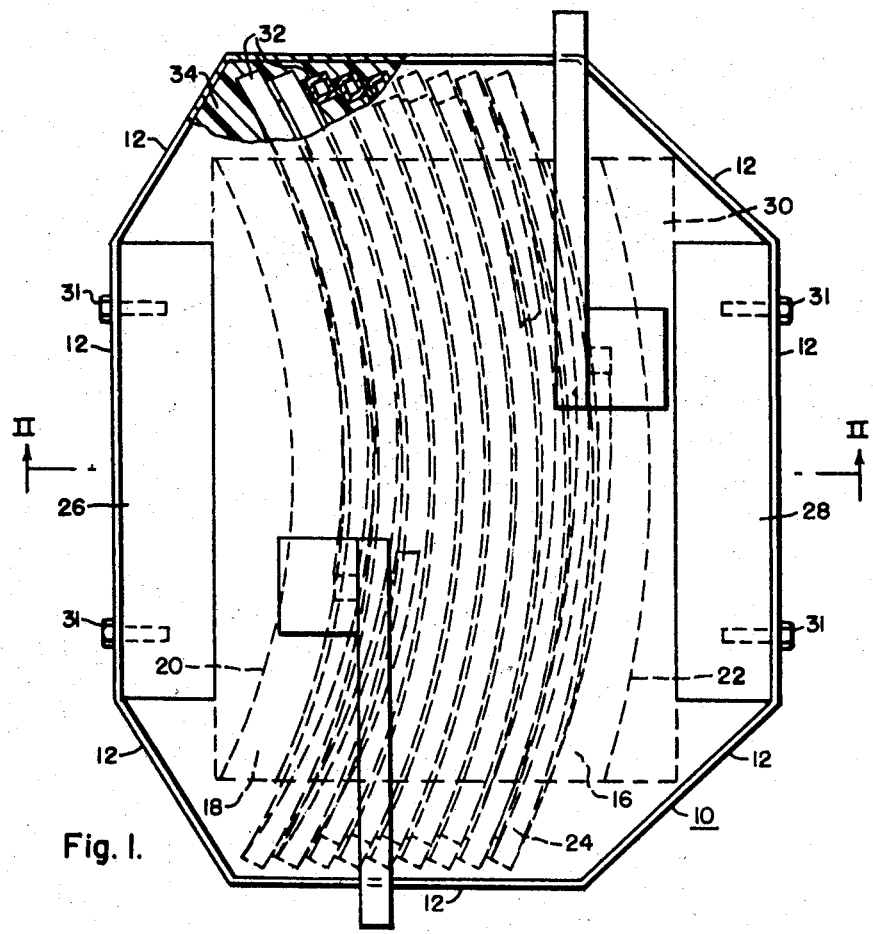
Figure 1 is a top plan view, partly in section, of an encapsulated induction heating coil assembly in a mold.

In accordance with this invention an induction heating coil assembly is encased in a specific resin composition to provide an encapsulated induction heating coil structure suitable for use in induction heating of members.

Briefly, the encapsulation is accomplished by placing an induction heating coil assembly comprising a magnetic shoe member and a tubular coil wrapped around the magnetic shoe member in an appropriate mold and filling the mold with a liquid resinous composition and curing the resin composition to an insoluble and infusible state. Appropriate spacing members, details of which will be set forth more fully hereinafter, may be employed to properly position the assembly in the mold during the molding procedure.

The liquid resinous composition employed in carrying out this invention is formed of a mixture of a liquid polysulfide resin, a liquid epoxy resin or epoxy resin forming material and a filler material. A small amount of curing agent may be employed in admixture with the above to accelerate the thermosetting or curing of the resinous composition.

The liquid organic polysulfide resins are known in the art and may be prepared as described in United States Patent 2,402,977, issued July 2, 1946, to J. C. Patrick and Harry R. Ferguson. The molecules of these polysulfide resins are made up of essentially straight chains of a plurality of organic radicals joined by linkages made up of sulfur atoms. The molecules terminate at each end with mercapto radicals and carry an occasional mercapto radical as a side group to provide cross-linking between linear chains upon curing. The organic radicals are commonly hydrocarbon radicals but may also contain oxygen hetero atoms in the hydrocarbon chains.

Polysulfide resins as a class are formed by the reaction of an alkaline polysulfide with an organic compound having at least two carbon-attached negative radical substituents which are capable of splitting off by reaction with the alkaline polysulfide. Although the negative radicals may theoretically be halogen, nitrate, sulphate, acid sulphate, carbonate, acetate, propionate, acid phosphate, tartrate and similarly acting radicals, chlorine substituents are the ones most commonly used in the art. When the organic compound reacts with the alkaline polysulfide, the alkaline radical combines with the chlorine or other negative substituent, leaving the residual organic radicals bonded together by polysulfide groups.

Polysulfied resins formed from organic compounds containing only two chlorine or other negative substituents are essentially linear and, when cured alone, are subject to cold flow. Polysulfide resins, formed from organic compounds containing more than two chlorine or other negative substituents, produce cross-linked or network molecular structures which, upon curing, do not flow substantially. Preferably, the polysulfide resins used for the formulation of the encapsulating composition of the present invention are formed from a mixture made up primarily of an organic compound having only two negative substituents but containing a small proportion of an organic compound having more than two negative substituents.

In the manufacture of polysulfide resins as described above, the viscosity of the resin can be controlled by mixing an alkaline hydrosulfide with the alkaline polysulfide which is reacted with the organic compound. As discussed in the above-mentioned United States Patent 2,402,977, the higher the ratio of hydrosulfide to polysulfide in the mixture, the lower the viscosity of the resin which is produced.

A particularly suitable polysulfide resin for the purposes of the present invention is one formed by the reaction of an alkaline polysulfide or alkaline hydrosulfide-polysulfide mixture, such as a mixture of sodium hydrosulfide and sodium tetrasulfide, with a mixture of dichlorodiethylformal containing between 1% and 3% of trichloropropane or dichlorpropyl mercaptan.

The average structure of liquid organic polysulfide resins is shown in the following structural formula:

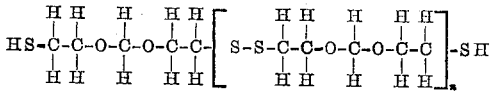

where $n$ is equal to from 3 to 26. The viscosity at 25° C. of the liquid polysulfide resins will usually vary from about 7 to 500 poises.

The epoxy resin, also known as a glycidyl polyether, or epoxy resin forming material used in the resinous composition of this invention comprises a polyepoxy compound, which is preferably a diglycidyl ether of a diphenol, in its monomeric or partially polymerized form. Such diglycidyl ethers are available in the art. Their preparation is described for instance, in United States Patent 2,506,486, issued May 2, 1950, to H. L. Bender, A. G. Farnham and J. W. Guyer.

Epoxy resins or glycidyl polyethers may be obtained by reacting predetermined amounts of at least one polyhydric phenol or polyhydric alcohol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bis-phenol "A"), 4,4' - dihydroxy - diphenyl - methyl-methane and 4,4'-dihydroxy-diphenyl-methane. In admixture with the named polynuclear phenols, use also may be made of those polynuclear phenols wherein the phenol nuclei are joined by sulfur bridges such as for example as 4,4'-dihydroxy-diphenyl-sulfone. Examples of suitable polyhydric alcohols include glycerol, propylene glycol and 1,4-pentanediol.

While it is preferred to use epichlorohydrin as the epihalohydrin in the preparation of the resinous polymeric epoxide starting materials of the present invention, other epihalohydrins, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The product of the reaction, instead of being a single simple compound, is generally a complex mixture of glycidyl polyethers, but the principal product may be represented by the formula:

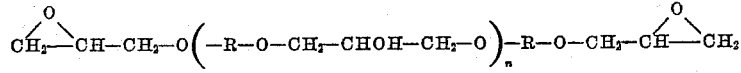

where $n$ is an integer of the series 0, 1, 2, 3, . . ., and R represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol suitable for use in this invention, has a 1,2-epoxy equivalency greater than 1.0. By epoxy equivalency reference is made to the average number of 1,2-epoxy groups

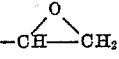

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers is thus a value between 1.0 and 2.0.

In other cases the epoxide equivalency is given in terms of epoxide equivalents in 100 grams of the resin, and this may vary from about 0.08 to 0.70. Also, epoxide equivalent is often expressed as the number of grams of resin containing one equivalent of epoxide.

The 1,2 epoxide value of the glycidyl polyether is determined by heating a weighed sample of the ether with an excess of 0.2 N pyridinium chloride in chloroform solution at the boiling point under reflux for 2 hours whereby the pyridinium chloride hydrochlorinates the epoxy groups to chlorohydrin groups. After cooling, the excess pyridinium chloride is back-titrated with 0.1 N sodium hydroxide in methanol to the phenolphthalein end point.

Resinous polymeric epoxides of glycidyl polyethers suitable for use in accordance with this invention may be prepared by admixing and reacting from one to two mol proportions of epihalohydrin, preferably epichlorohydrin, with about one mol proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrin added thereto, or an aqueous solution of alkali and bis-phenol "A" may be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

Any alkaline reacting substance can be used as a curing catalyst in carrying out this invention. Preferably, however, an amine is used for this purpose. Among the suitable amines may be mentioned the primary, secondary, or tertiary monoamines, diamines or triamines such, for example, as dimethylamine, trimethylamine, triethylamine, diethylene triamine and ethylene diamine.

Since alkaline materials are catalysts for the curing of polyepoxy compounds alone, as well as for mixtures of polyepoxy compounds with polysulfide resins, the catalyst should not be brought into contact with the polyepoxy compound prior to the preparation of the mixture for injection. The catalyst, however, has no effect upon the polysulfide resin and therefore can be mixed therewith prior to the preparation of the final mixture. The premixing of the catalyst with the polysulfide resin simplifies the effective dispersion of the catalyst at the time the polyepoxy compound is added without the necessity for excessive mixing.

The polysulfide resin and the polyepoxy resin are so proportioned in forming the encapsulating mixture that for each part by weight of polysulfide resin there is provided from one part to six parts by weight of polyepoxy resin. If a curing catalyst is employed, the amount used will ordinarily be between about .2% to about 10%, by weight, of the total weight of the resinous components.

Filler material employed in carrying out this invention is preferably finely divided mica. Other non-metallic filler materials such, for example, as finely divided silica, asbestos fibers, and chopped glass fibers may be employed if desired. The amount of filler material employed will ordinarily comprise from about 10% to 75% of the total weight of the resinous components.

Example I

A suitable encapsulating resinous composition is formed by mixing together the following:

| | Parts by weight |
|---|---|
| Liquid polysulfide resin | 300 |
| Liquid polyepoxy resin | 300 |
| Finely divided mica | 100 |
| Amine catalyst (phenylene diamine) | 5 |

The polyepoxy resin, polysulfide resin and mica are mixed thoroughly for about 15 minutes using a power driven stirrer. The mixture is then evacuated at an absolute pressure of 1 cm. of mercury until substantially all entrapped air has been removed from the mixture. The catalyst addition is then made and this mixture is thoroughly admixed for about 15 minutes. Any entrapped air is removed by evacuating the mixture at an absolute pressure of 1 cm. of mercury. It is to be noted that the catalyst addition is not made until just before encapsulation.

Figure 2:
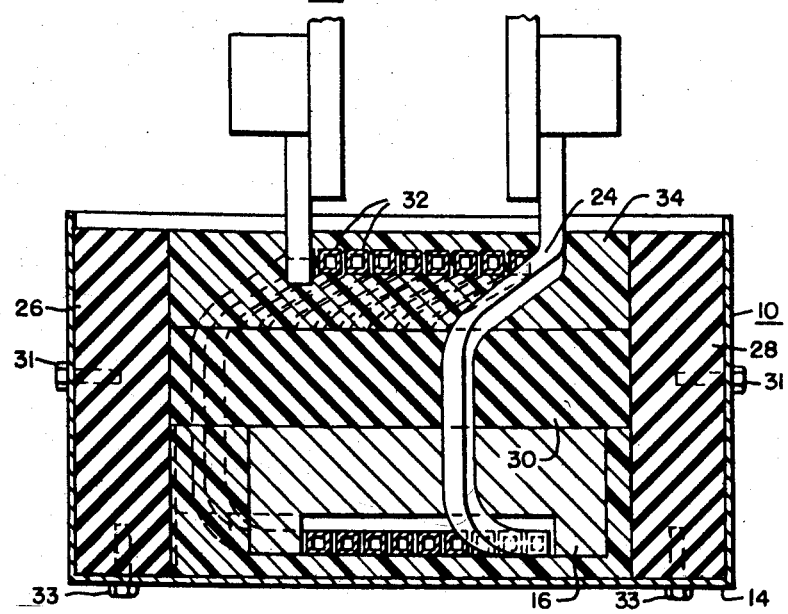
Fig. 2 is a cross sectional view through an encapsulated induction heating coil assembly and a mold.

Referring now to Fig. 1 and Fig. 2 of the drawing there is shown a hexagonal mold 10 prepared in any conventional manner from sheet aluminum or other suitable material. The mold 10 comprises six side members 12 and a base 14 and is open at the top. It is desirable to coat the inside surfaces of the mold with a mold release compound such, for example, as a silicone grease prior to pouring the liquid resin composition into the mold.

An induction heating coil assembly comprising a flat arcuate magnetic shoe member 16 having an arcuate groove 18 in the bottom face thereof and defined by front and rear arcuate projections 20 and 22, and a tubular coil 24 is placed within the mold 10. The tubular coil 24 is wound around the magnetic shoe member 16 so that the lower portion thereof is disposed within the groove 18. The tubular coil 24 is adapted for the passage of a cooling fluid, such as water, therethrough. The assembly is so positioned in the mold that a space of the order of about 30 mils exists between the base 14 of the mold and the bottom portion of the coils and the magnetic shoe member.

Spacing members 26 and 28 are shown disposed at the front and rear of the coil 24 and spacing member 30 is disposed within the coil 24. The spacing members are secured to and properly positioned in the mold 10 by means of side screws 31 and bottom screws 33. The spacing members are an expedient to keep the coil and magnetic shoe member in proper position during the pouring of the liquid resin composition into the mold. The spacing members are prepared from electrically insulating heat resistant non-metallic material. Examples of such spacing member materials are laminates prepared from sheet or macerated fibrous material impregnated and bonded together by a heat resistant resin composition. Such materials are sold commercially under the proprietary names Bakelite and Micarta.

To prevent the closely spaced turns of the coil 24 from coming into contact with one another solid electrically insulating members 32 may be employed between the turns. Thin sheets of mica have proven satisfactory for this purpose.

The thermosetting encapsulating resin composition 34 fills the spaces between the spacing member and completely covers the coil 24, the mold 10 having a sufficient depth to allow for complete resin coverage of the coil turns.

To improve the insulating properties of the encapsulating resinous composition, it is desirable to remove substantially all the air and gases that may become entrapped therein. This may be accomplished by initially filling about one-half of the mold with liquid resinous composition and then evacuating the mold at an absolute pressure of about 1 cm. of mercury for about 5 minutes. The mold is then filled with resin composition and again subjected to the evacuation treatment. Curing of the resin composition is accomplished by heating the assembly to a temperature of about 70° C. for about 16 hours. Higher curing temperatures may be employed if desired. High temperatures will result in shorter curing times.

After the encapsulating resin composition has been poured into the mold and has cured to the thermoset solid state, the screws 31 and 33 are removed and the resin encapsulated induction heating coil structure removed from the mold. The spacing members 30, 32 and 34, remain embedded in and are firmly bonded to thermoset encapsulating resin composition 38 and form a part of the encapsulated induction heating coil structure. To more adequately protect the encapsulated coil from damage due to buckling or the like of the heated work piece during operation, a thin sheet of the order of about 50 mils in thickness of a flat heat resistant non-metallic member may be applied thereto by means of screws. This may be accomplished by employing screws 33 and the already tapped holes in the spacing member 26 and 28. This thin sheet may also have applied thereto a thin layer of about 20 to 50 mils of aluminum oxide to absorb some of the heat produced by the heated work piece. It has been found that a flat member composed of a mixture of inorganic cement and asbestos fibers is suitable for this purpose. Examples of suitable members are available commercially under the proprietary names Monobestos and Transite.

Although the above description refers to the preferred embodiment of this invention, it will be understood by those skilled in the art that resin encapsulated induction heating coil structures other than that shown in the drawing may be prepared without departing from the scope of this invention. For example, an induction heating coil assembly comprising on a small number, for example 3 or 4, of widely spaced turns can be encapsulated simply by properly positioning the assembly in an appropriate mold and then pouring and curing the resin. No spacing member or mica turn separators would be required.

It has been found desirable to provide a heat resistant thermoset organopolysiloxane surface coating on the encapsulated member. The heat resistant surface coating will serve to protect the encapsulated member more effectively from the deleterious effects of moisture, dirt and the like and will further serve to provide a smooth even surface on the encapsulating resin by covering any rough or uneven surfaces that may exist thereon after the molding operation.

The organosiloxane resins that have been found particularly satisfactory are the phenyl methyl polysiloxanes having from 1.3 to 1.95 phenyl and methyl groups per silicon atom. Particularly good results are obtained with organosiloxanes having a total of from 1.5 to 1.8 phenyl and methyl groups per silicon atom. It will be understood that other heat-hardenable organosiloxanes having other organic groups than phenyl and methyl groups may be employed to replace a part or all thereof. It will be further appreciated that the phenyl methyl organosiloxanes may include a small proportion of other organic groups such as tolyl, allyl, ethyl and the like. The organosiloxanes are soluble in toluene, xylene and other aromatic solvents or mixtures of two or more. Other solvents, such as chlorinated aliphatics, are also available and known in the art.

The coating composition may also contain finely divided non-metallic filler materials such as titanium dioxide, aluminum oxide, zirconium oxide, mica, a mixture of silicates comprising an enamel frit, and the like.

The encapsulated induction heating coil members of this invention are easily and readily secured to induction heating machines, and the turns of the coils are protected from the deleterious effects of industrial atmospheres.

It will be understood that the above description and drawing are only exemplary and not in limitation of the invention.

I claim as my invention:

1. A resin encapsulated induction heating coil structure suitable for use in induction heating of members, comprising a thin flat heat resistant non-metallic base member, a flat arcuate magnetic shoe member having an arcuate groove in the bottom face thereof defined by front and rear arcuate projections, a tubular coil for the passage of a cooling fluid therethrough wound around the magnetic shoe member and having a flat bottom portion disposed within said groove, spacing members disposed at the front and rear of the coil and within the coil, thin, solid electrically insulating members separating the turns of the coil, and an encapsulating resinous composition encasing the coil, magnetic core member and filling the spaces between the spacing members, the resinous composition extending to the upper surface of the base member, said encapsulating resinous composition derived by the curing in situ, to a thermoset state, a mixture of a liquid organic polysulfide resin, a liquid organic polyepoxy compound and finely divided mica.

2. The induction heating coil structure of claim 1, wherein the resinous composition comprises from six parts to one part by weight of the glycidyl polyether per part of polysulfide resin, and the mica comprises from 10% to 75% of the weight of the resinous components, and up to 5% by weight of an alkaline catalyst, based on the total weight of the polysulfide resin and glycidyl polyether.

3. The encapsulated induction heating coil structure of claim 1, wherein there is applied to surface thereof a heat-hardenable surface coating comprising a thermoset organopolysiloxane resin composition.

4. A resin encapsulated induction heating coil structure suitable for use in induction heating of members, comprising a flat arcuate magnetic shoe member having an arcuate groove in the bottom face thereof defined by front and rear arcuate projections, a tubular coil for the passage of a cooling fluid therethrough wound around the magnetic shoe member and having a flat bottom portion disposed within said groove, and an encapsulating resinous composition separating the turns of the coil and encasing the coil and magnetic core member, said encapsulating resinous composition derived by the curing in situ, to a thermoset state, a mixture of a liquid organic polysulfide resin, a liquid organic polyepoxy compound and finely divided mica.

5. The induction heating coil structure of claim 4, wherein the resinous composition comprises from six parts to one part by weight of the glycidyl polyether per part of polysulfide resin, and the mica comprises from 10% to 75% of the weight of the resinous components, and up to 5% by weight of an alkaline catalyst, based on the total weight of the polysulfide resin and the glycidyl polyether.

6. In the method of encapsulating an induction heating coil assembly comprising a magnetic shoe member and a tubular coil wound around the magnetic shoe member, the steps comprising applying to said induction heating coil assembly, so as to completely cover the coil turns and magnetic shoe member, a resinous composition comprising a liquid organic polysulfide resin, a liquid organic polyepoxy compound and finely divided mica, and polymerizing and solidifying the said applied resinous composition to a thermoset state, thereby producing an induction heating coil structure with solid resinous insulating material applied thereto.

7. The method of claim 6 wherein the resinous composition comprises from six parts to one part by weight of the glycidyl polyether per part of polysulfide resin, and the mica comprises from 10% to 75% of the weight of the resinous components, and up to 5% by weight of an alkaline catalyst, based on the total weight of the polysulfiide resin and the glycidyl polyether.

References Cited in the file of this patent

UNITED STATES PATENTS

| | | |
|---|---|---|
| 2,402,977 | Patrick | July 2, 1946 |
| 2,785,383 | Foster | Mar. 12, 1957 |
| 2,795,009 | Gosnell et al. | June 11, 1957 |